July 10, 1956 R. C. RUSSELL 2,753,855
SELF-ADJUSTING VALVE ACTUATING MECHANISM
Filed Jan. 20, 1954
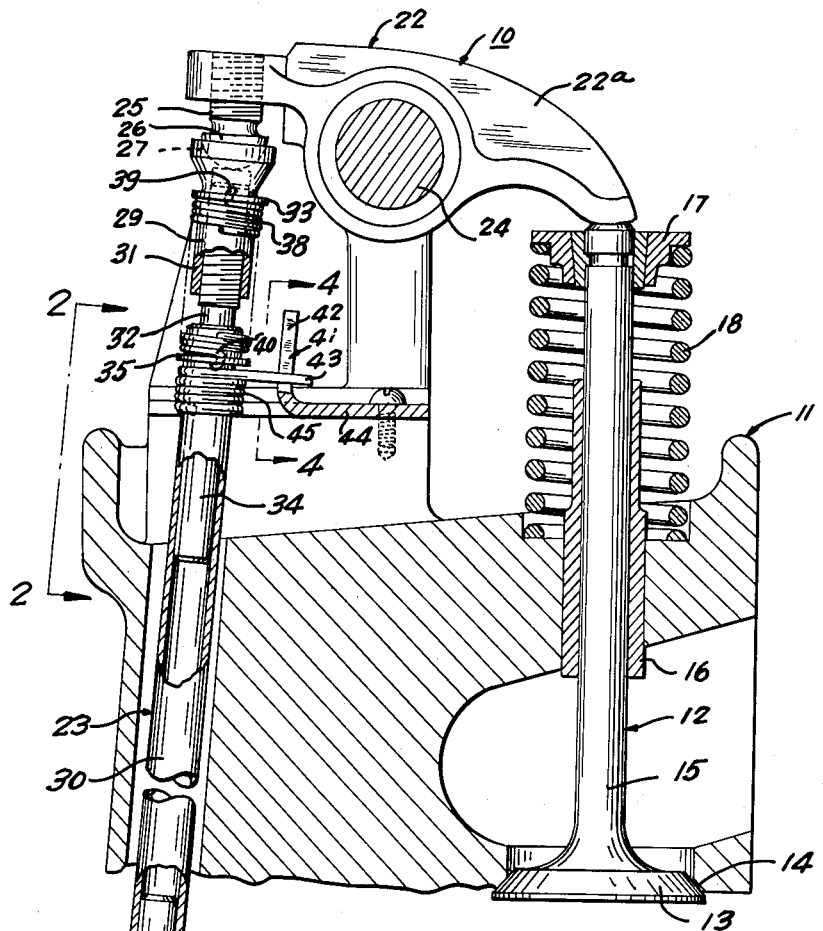
FIG.1
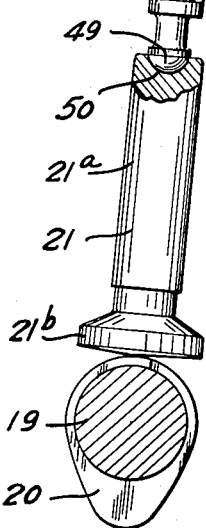
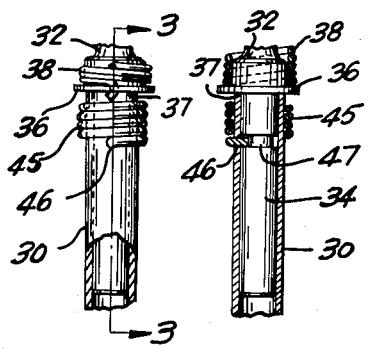
FIG.2  FIG.3
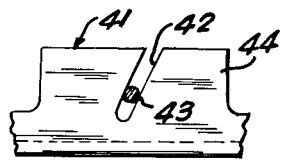
FIG.4
INVENTOR.
ROBERT C. RUSSELL
BY Hudson, Boughton,
Williams, David & Hoffman
ATTORNEYS

United States Patent Office 2,753,855
Patented July 10, 1956

2,753,855
SELF-ADJUSTING VALVE ACTUATING MECHANISM

Robert C. Russell, South Euclid, Ohio, assignor to Eaton Manufacturing Company, Cleveland, Ohio, a corporation of Ohio Application January 20, 1954, Serial No. 405,196

9 Claims. (Cl. 123—90)

This invention relates to actuating linkages for engine valves and, more particularly, to linkages for this purpose which are of the automatic length adjusting type, such that satisfactory seating of the valves will be assured regardless of the occurrence of expansion, contraction, wear and like variations in the linkages.

An object of the invention is to provide novel valve actuating linkage of the automatic length adjusting type which is of a relatively simple and reliable construction employing a minimum number of parts, and in which a rotative adjusting movement is imparted to a length adjusting means by a rotatable push rod member in engagement therewith.

Another object is to provide novel valve actuating linkage of this character in which the rotatable push rod member has a positive rotative movement imparted thereto during the axial reciprocation thereof, by projection means fixed on such rotatable push rod member and engaging an adjacent cam means.

Still another object is to provide valve actuating linkage of the above-indicated type in which the projection means of the rotatable push rod member is an arm of a coiled wire sleeve having a tight and relatively fixed engagement on such rotatable push rod member.

Additionally, this invention provides novel valve actuating linkage of the kind referred to above in which the length adjusting means comprises torsion spring controlled threadedly connected push rod members one of which has a stem portion telescopingly engaged in the hollow end of an adjacent rotatable push rod member, and in which one end of the fixed wire sleeve of the rotatable push rod member defines the cam engaging arm and the other end of the sleeve defines a locking means.

The invention can be further briefly summarized as consisting in certain novel combinations and arrangements of parts hereinafter described in detail and particularly set out in the claims hereof.

In the accompanying sheet of drawings, forming a part of this specification:

Fig. 1 is mainly a vertical transverse section taken through engine valve mechanism embodying the novel valve actuating linkage of this invention;

Fig. 2 is a partial side elevation looking toward the length adjusting means of the linkage, as indicated by the directional line 2—2 of Fig. 1;

Fig. 3 is a sectional detail view taken axially of the push rod means, as indicated by section line 3—3 of Fig. 2; and Fig. 4 is a partial side elevation of the cam means serving the length adjusting means, the view being taken as indicated by the direction line 4—4 of Fig. 1.

As one highly practical embodiment of this invention, the drawings show valve mechanism 10 as forming a part of an internal combustion engine 11 having a movable valve 12. The valve 12 is of a conventional type having a head 13 engageable with a valve seat 14, and a stem 15 extending through and slidable in a guide bushing 16. A spring seat 17, carried by the outer or upper end of the valve stem 15, is engaged by a surrounding valve spring 18 which acts to normally urge the valve toward its closed position in engagement with the valve seat 14.

The engine 11 is also provided with a conventional rotatable cam shaft 19 having valve actuating main cams 20 thereon. The cams 20 are engageable, respectively, with tappets 21 and impart an upward valve opening movement thereto. The tappets 21 are of a conventional form and each comprise an upper stem portion 21ª slidably mounted in a guideway of the engine and a lower cam follower portion 21ᵇ engaged by the main cam 20.

The valve mechanism 10 also comprises thrust transmitting linkage extending between the valve stem 15 and the tappet 21 and comprising, in general, a rocker means 22 and a push rod means 23. The rocker means 22 is in the form of a rocker lever 22ª supported for rocking movement about the axis of a rockshaft 24, and a threadedly adjustable thrust member 25 carried by one arm of the rocker lever and having a substantially semispherical head 26 rockably engaging in a socket 27 on the upper end of the push rod means 23. The other arm of the rocker lever 22ª engages the upper end of the valve stem 15.

The push rod means 23 comprises a rotative movement responsive length adjusting upper push rod portion or unit 29, and a lower hollow push rod member 30 which is rotatable about the axis of the push rod means. As will be further explained hereinafter, the push rod member 30 applies the rotative adjusting movement to the length adjusting portion 29.

The length adjusting portion 29 is formed by a pair of relatively rotatable threadedly connected screw members constituting the push rod members 31 and 32. The push rod member 31 is in the form of an internally threaded sleeve or nut member having the socket 27 in the upper end thereof and also having a collar or flange 33 thereon adjacent the socket. The push rod member 32 comprises an externally threaded stem or screw member extending into the threaded sleeve of the push rod member 31. The push rod member 32 also has a stem portion 34 extending in telescoping relation into the upper end of the hollow push rod member 30. The member 32 has a collar or flange 35 thereon at an intermediate point of its length and a downwardly facing annular shoulder or thrust surface 36 formed by, or adjacent to, the lower face of the collar and which is engaged by the annular upper end surface 37 of the rotatable push rod member 30.

The length adjusting push rod portion 29 also comprises a torsion spring 38 disposed around the push rod members 31 and 32 and provided at its upper and lower ends with hook portions 39 and 40. These hook portions 39 and 40 are engaged, respectively, in openings of the collars 33 and 35 for connecting the ends of the torsion spring in driving relation with the push rod members 31 and 32. The torsion spring 38 is so disposed on the length adjusting portion 29 that it normally tends to cause relative rotation between threadedly connected push rod members 31 and 32 in a direction to lengthen the valve actuating linkage by lengthening the push rod means 23 thereof.

As an important relation existing between certain of the cooperating thrust bearing surfaces of the linkage, it is pointed out that the area of bearing surface contact between the ball portion 26 of the rocker means 22 and the socket 27 at the upper end of the push rod means 23 is substantially greater than the area of bearing surface contact between the annular shoulder 36 of the push rod member 32 and the end surface 37 of the hollow push rod member 30. Because of this relatively larger surface contact area at the upper end of the length adjusting means 29, the amount of friction or braking torque between the contact surfaces at the upper end will also be relatively greater and will tend to hold the push rod member 31 against rotation while rotative movement or driving torque is being imparted to the push rod member 32 by the rotatable push rod member 30. The direct engagement of the upper end surface 37 of the rotatable push rod member 30 with the shoulder 36 of the push rod member 32 causes the latter to be rotatably driven by the push rod member 30 in a direction to cause shortening of the length of adjusting means 29 when the push rod member 30 is rotated about the axis of the push rod means 23.

Rotation of the push rod member 30 about the push rod axis is produced by the action of a cam means 41 which comprises cooperating fixed and movable cam elements 42 and 43. The fixed cam element 42 is in the form of an inclined cam slot carried by a bracket 44 which is suitably secured to the engine 11 adjacent the push rod means 23. The movable cam element 43 is carried by the push rod means 23 and is in the form of an arm engaging in and movable along the inclined slot 42.

The rotative movement produced by the cam means 41 is a positive rotary movement which, in accordance with this invention, is applied to the push rod member 30 through a drive sleeve 45 having a relatively fixed engagement with the latter. The sleeve 45 is in the form of a self-contracting helically coiled wire sleeve which is disposed in surrounding relation to the push rod member 30 adjacent the end surface 37 thereof and which constantly grips this push rod member with sufficient force to have a relatively fixed engagement thereon. The movable cam element 43 is here shown as being a laterally projecting arm extending from the sleeve 45 of the push rod member 30 and, when the sleeve 45 is a coiled wire sleeve as just explained above, this cam element is formed by one end of the wire of such sleeve.

The stem 34 of the push rod member 32, which extends in telescoping relation into the hollow push rod member 30, is provided with an annular groove 47 located opposite a radial opening 46 in the wall of the push rod member 30. The portion of the coiled wire defining the lower end of the gripping sleeve 45 includes an inturned portion forming a locking element 48 which extends through the opening 46 of the push rod member 30 into the groove 47 of the stem 34. The locking element 48 prevents withdrawal of the stem 34 from the hollow push rod member 30 and thus maintains the telescoping engagement of this stem in the hollow push rod member. The gripping engagement of the sleeve 45 with the hollow push rod member 30 enables this sleeve to act as a drive sleeve for imparting rotative movement to this push rod member. This gripping action and the engagement of the element 48 in the opening 46, hold the sleeve 45 in the desired fixed and non-rotatable relation on the push rod member 30.

The lower end of the push rod member 30 is suitably engaged in thrust transmitting relation with the tappet 21, as by having a rounded thrust portion 49 seating in a socket recess 50 of the upper end of the tappet stem 21ª.

In the operation of the valve linkage, an upward axial movement imparted to the push rod means 23 by the main actuating cam 20 through the tappet 21, will cause valve opening movement to be transmitted by the linkage to the valve 12. During this upward valve opening movement of the push rod means 23, and during that portion of its downward movement which precedes the engagement of the valve 12 with the seat 14, the linkage will be under valve actuating load such that the friction existing between the ball portion 26 and the socket 27 will tend to hold the push rod member 31 against rotation about the push rod axis. During this downward movement of the push rod means 23 preceding the seating of the valve 12, the movable cam element 43 is advanced along the inclined cam slot 42, thereby producing a positive rotative movement and applying the same to the push rod member 30 through the drive sleeve 45.

This positive rotative movement imparted to the push rod member 30, is transmitted directly to the push rod member 32 through the cooperating shoulders 36 and 37. The direction of inclination of the cam slot 42 is such that the rotation of the push rod members 30 and 32 produced thereby is in a direction to screw the latter member into the internally threaded sleeve of the push rod member 31, thereby shortening the valve actuating linkage and also tensioning the torsion spring 38. The shortening of the linkage introduces thereinto what can be conveniently referred to as "lift loss" and which is very small in amount so as to be insufficient to prevent opening of the valve 12 to the desired extent by the linkage. This shortening of the linkage by introduction of lift loss occurs during each valve closing movement of the linkage.

When the valve 12 has been moved to its closed position in engagement with the valve seat 14 by the spring 18, the valve actuating load is removed from the linkage and thereupon the tendency of the ball portion 26 to frictionally hold the push rod member 31 against rotation is relieved. The torsion spring 38 will then rotate the push rod member 31 in a direction to automatically lengthen the linkage by lengthening the push rod means 23. The lift loss introduced into the linkage as explained above insures a full and positive seating of the valve and, when such seating of the valve has taken place, the lift loss is removed from the linkage by the automatic lengthening resulting from the rotation of the push rod member 31 by the torsion spring 38.

The upward axial movement of the push rod means 23 during the next succeeding valve opening movement of the linkage, returns the movable cam element 43 to the upper portion of the inclined cam slot 42, but by the time the movable cam element has reached this location, the automatic lengthening of the linkage by the action of the torsion spring 38 in rotating the push rod member 31, will have occurred.

In addition to accomplishing an automatic length adjustment of the linkage for insuring proper seating of the valve 12 and compensating for wear and the effects of expansion and contraction, the length adjusting means 29 also prevents or minimizes uneven wear which would otherwise occur as the result of the relative rocking movement between the rocker means 22 and the upper end of the push rod means. This elimination of uneven wear is achieved by an intermittent unidirectional rotative movement being imparted to the length adjusting means 29 as a unit about the push rod axis. This intermittent or step-by-step unidirectional rotative movement results from the conjoint action of the push rod member 30 and the torsion spring 38 on the length adjusting means 29, during which the push rod members 31 and 32 are rotated in succession by the push rod member 30 and the torsion spring, respectively. The conjoint action of the push rod member 30 and the torsion spring 38 thus produces a more or less continuous intermittent unidirectional rotation of the length of adjusting means 29 about the push rod axis during the reciprocation of the push rod means 23.

The amount of friction existing between the push rod portions 26 and 27 while the linkage 10 is under load, is greater than the friction between the screw threads of the members 31 and 32, such that the above-explained rotative movement applied to the member 32 will be effective in screwing the latter into the member 31 for shortening the linkage. The friction existing between the flat annular surfaces or shoulders 36 and 37 while the linkage 10 is under load, is usually less than the friction between the push rod portions 26 and 27 but is sufficient to cause the rotative shortening movement being supplied by the cam means 42, to be applied to the member 32.

When the load on the linkage 10 is relieved and the torsion spring 38 is acting to lengthen the linkage by producing a relative unscrewing action between the members 31 and 32, such unscrewing rotative movement may be applied entirely to the member 31. Usually however, some of the relative unscrewing rotative movement is imparted to both of the members 31 and 32 and this is desirable because it prevents the member 31 from being repeatedly returned to the same position relative to the member 25 during successive valve operating cycles of the linkage. The wear occurring from the relative rocking between the portions 26 and 27 will thereby be prevented from being localized in one spot and will be relatively evenly distributed around the bearing surfaces of these portions.

From the accompanying drawing and the foregoing detailed description, it will now be readily understood that this invention provides engine valve mechanism embodying novel valve actuating linkage of the automatic length adjusting type in which a positive rotative movement imparted to a rotatable push rod member causes an adjusting rotative movement to be transmitted to one of a pair of threadedly connected linkage members for producing the desired length adjustment of the linkage for insuring proper seating of the engine valve, notwithstanding the occurrence of expansion, contraction or wear in such linkage. It will now also be seen that positive rotative movement is imparted to the rotatable push rod member through a projecting lever arm portion of a sleeve mounted in a fixed relation on such rotatable push rod member. Additionally, it will be seen that by making the fixed sleeve in the form of a self-contracting coiled wire sleeve it can be very economically produced and assembled, and the end portions of the wire sleeve can be utilized, respectively, as the cam-engaged arm projection and a holding means for maintaining a desired telescoping engagement between adjacent push rod members.

Although the novel valve actuating linkage of this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In engine valve linkage of the kind adapted to be actuated by a rotatable engine cam, a pair of threadedly connected push rod members, a rotatable push rod member engaging one member of said pair for imparting rotation thereto in a direction to produce shortening of said linkage, torsion spring means effective to cause relative rotation between said pair of push rod members in a direction to produce lengthening of the linkage, a fixed cam means adjacent said push rod members, and sleeve means fixed on said rotatable push rod member and having cam follower engagement with said fixed cam means for causing the rotation of said rotatable push rod member.

2. In engine valve linkage of the kind adapted to be actuated by a rotatable engine cam, an axially movable push rod means comprising a pair of threadedly connected push rod members and a rotatable push rod member engaging one member of said pair and adapted to apply rotative adjusting movement to the latter in a direction to cause shortening of the linkage, torsion spring means effective to cause relative rotation between said pair of push rod members in a direction to produce lengthening of the linkage, a fixed inclined cam means adjacent said push rod means, and sleeve means fixed on said rotatable push rod member and having arm means engaging said inclined cam means for causing rotation of said rotatable push rod member during axial movement of the push rod means.

3. In engine valve actuating linkage; a rocker means; an axially reciprocable push rod means comprising a first push rod member rotatable about the axis of said push rod means, and a length adjusting means extending between said rocker means and said first push rod member and comprising a pair of threadedly connected other push rod members; one of said other push rod members being engaged and rotatable by said first push rod member in a direction to cause shortening of the linkage; torsion spring means effective to cause relative rotation between said pair of other push rod members in a direction to produce lengthening of the linkage; means defining inclined cam surface means adjacent said push rod means; and sleeve means mounted in relatively fixed relation on said first push rod member and having projecting means in cam follower engagement with said cam surface means for causing the rotative movement of said first push rod member.

4. Engine valve linkage as defined in claim 3 in which said sleeve means is a coiled wire sleeve, and in which a projecting portion of the wire sleeve forms a cam follower means having said cam follower engagement.

5. Engine valve linkage as defined in claim 3 in which said sleeve means is a self-contracting coiled wire sleeve disposed around and gripping said first push rod member, and in which one end of the wire of said wire sleeve forms a cam follower arm in engagement with said cam surface means.

6. In engine valve actuating linkage; a rocker means; an axially reciprocable push rod means comprising a first push rod member rotatable about the axis of said push rod means, and a length adjusting means extending between said rocker means and said first push rod member; said length adjusting means comprising relatively rotatable threadedly connected other push rod members, and torsion spring means engaging said other push rod members and tending to cause relative rotation therebetween in a direction to produce lengthening of said linkage; means defining an inclined cam slot adjacent said push rod means; and a self-contracting coiled wire sleeve disposed around and gripping said first push rod member and having a projecting arm portion engaged in said cam slot; said first push rod member being in engagement with and effective to impart rotation to one of said other push rod members in a direction to produce shortening of said linkage.

7. In length adjusting engine valve linkage, an axially reciprocable push rod means comprising a rotatable hollow push rod member having an opening in the wall thereof and a pair of torsion spring controlled threadedly connected other push rod members one of which is directly engaged and rotatable by said hollow push rod member, said one push rod member having a stem portion in telescoping engagement with said hollow push rod member and provided with an annular groove located opposite said opening, means defining a fixed inclined cam slot adjacent said push rod means, and a coiled wire drive sleeve mounted on and having relatively fixed driving connection with said hollow push rod member for imparting rotation thereto, said drive sleeve having at one end thereof an arm projection engaging in said cam slot and at the other end a projection engaging in said opening and groove.

8. In engine valve linkage of the kind adapted to be actuated by a rotatable engine cam, an axially movable push rod means comprising a pair of threadedly connected push rod members and a rotatable push rod member engaging one member of said pair for imparting rotation thereto in a direction to cause shortening of said linkage, torsion spring means effective to cause relative rotation between said pair of push rod members in a direction to produce lengthening of the linkage, other cam means responsive to axial movement of said push rod means for producing a rotative movement, and means attached to said rotatable push rod member for applying thereto the rotative movement produced by said other cam means.

9. In self-adjusting engine valve linkage of the kind adapted to be actuated by a rotatable engine cam, an axially reciprocable push rod means comprising a pair of threadedly connected push rod members and a rotatable push rod member engaging one member of said pair for imparting intermittent rotation thereto in a direction to cause shortening of the linkage, torsion spring means effective to cause relative rotation between said pair of push rod members in a direction to produce lengthening of the linkage, other cam means comprising fixed and movable cam elements responsive to axial movement of said push rod means for producing a rotative movement, and means connecting said movable cam element with said rotatable push rod member for applying to the latter the rotative movement produced by said cam means.

References Cited in the file of this patent

UNITED STATES PATENTS

| | | |
|---|---|---|
| 2,642,048 | Russell | June 16, 1953 |
| 2,642,049 | Russell | June 16, 1953 |